US012710867B2

(12) United States Patent
Yang et al.

(10) Patent No.: US 12,710,867 B2
(45) Date of Patent: Aug. 18, 2026

(54) STORAGE DEVICE AND STORAGE SYSTEM INCLUDING THE SAME

(71) Applicant: Samsung Electronics Co., Ltd., Suwon-si (KR)

(72) Inventors: Seungjun Yang, Suwon-si (KR); Nam Wook Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 18/930,124

(22) Filed: Oct. 29, 2024

(65) Prior Publication Data

US 2025/0251859 A1 Aug. 7, 2025

(30) Foreign Application Priority Data

Feb. 7, 2024 (KR) ........................ 10-2024-0019063

(51) Int. Cl.
*G06F 3/06* (2006.01)

(52) U.S. Cl.
CPC .......... *G06F 3/0608* (2013.01); *G06F 3/0659* (2013.01); *G06F 3/0688* (2013.01)

(58) Field of Classification Search
CPC .... G06F 3/0608; G06F 3/0659; G06F 3/0688; G06F 3/0652; G06F 3/0679
See application file for complete search history.

(56) References Cited

U.S. PATENT DOCUMENTS

| | | | | |
|---|---|---|---|---|
| 9,792,067 | B2 | 10/2017 | Tomlin | |
| 10,635,595 | B2 | 4/2020 | Taylor | |
| 10,909,030 | B2 | 2/2021 | Desai et al. | |
| 11,086,562 | B2 | 8/2021 | Tatsumi et al. | |
| 11,409,472 | B1 | 8/2022 | Tan | |
| 11,669,264 | B2 | 6/2023 | Sasaki et al. | |
| 2016/0117112 | A1 | 4/2016 | Tomlin | |
| 2018/0107400 | A1* | 4/2018 | Tsai | G06F 3/064 |
| 2019/0034343 | A1 | 1/2019 | Taylor | |
| 2019/0095132 | A1 | 3/2019 | Tatsumi et al. | |
| 2020/0081830 | A1 | 3/2020 | Desai et al. | |
| 2020/0104384 | A1* | 4/2020 | Knierim | G06F 12/0246 |
| 2022/0011964 | A1* | 1/2022 | Sasaki | G06F 3/0659 |
| 2023/0229312 | A1 | 7/2023 | Hong et al. | |
| 2024/0361957 | A1* | 10/2024 | Hahn | G06F 3/0659 |

* cited by examiner

*Primary Examiner* — Sean D Rossiter
(74) *Attorney, Agent, or Firm* — Fish & Richardson P.C.

(57) ABSTRACT

A storage device may include a plurality of non-volatile memories, a host interface configured to receive at least one packet including a TRIM command from a host device, and the host interface configured to determine a trim path for processing the TRIM command by comparing a first trim range threshold value and a trim range of the TRIM command, a trim manage module configured to generate status data by monitoring the at least one packet, the trim manage module configure to determine the first trim range threshold value based on the status data, and a processor configured to process the TRIM command based on the trim path.

20 Claims, 9 Drawing Sheets

21
201
HOST I/F
203
TRIM MANAGE MODULE
2031
MONITORING CIRCUIT
2033
THRESHOLD DETERMINATION CIRCUIT
2035
INPUT CONTROL CIRCUIT
205
PROCESSOR
207
FTL
209
BUFFER
211
MEMORY I/F

FIG. 3

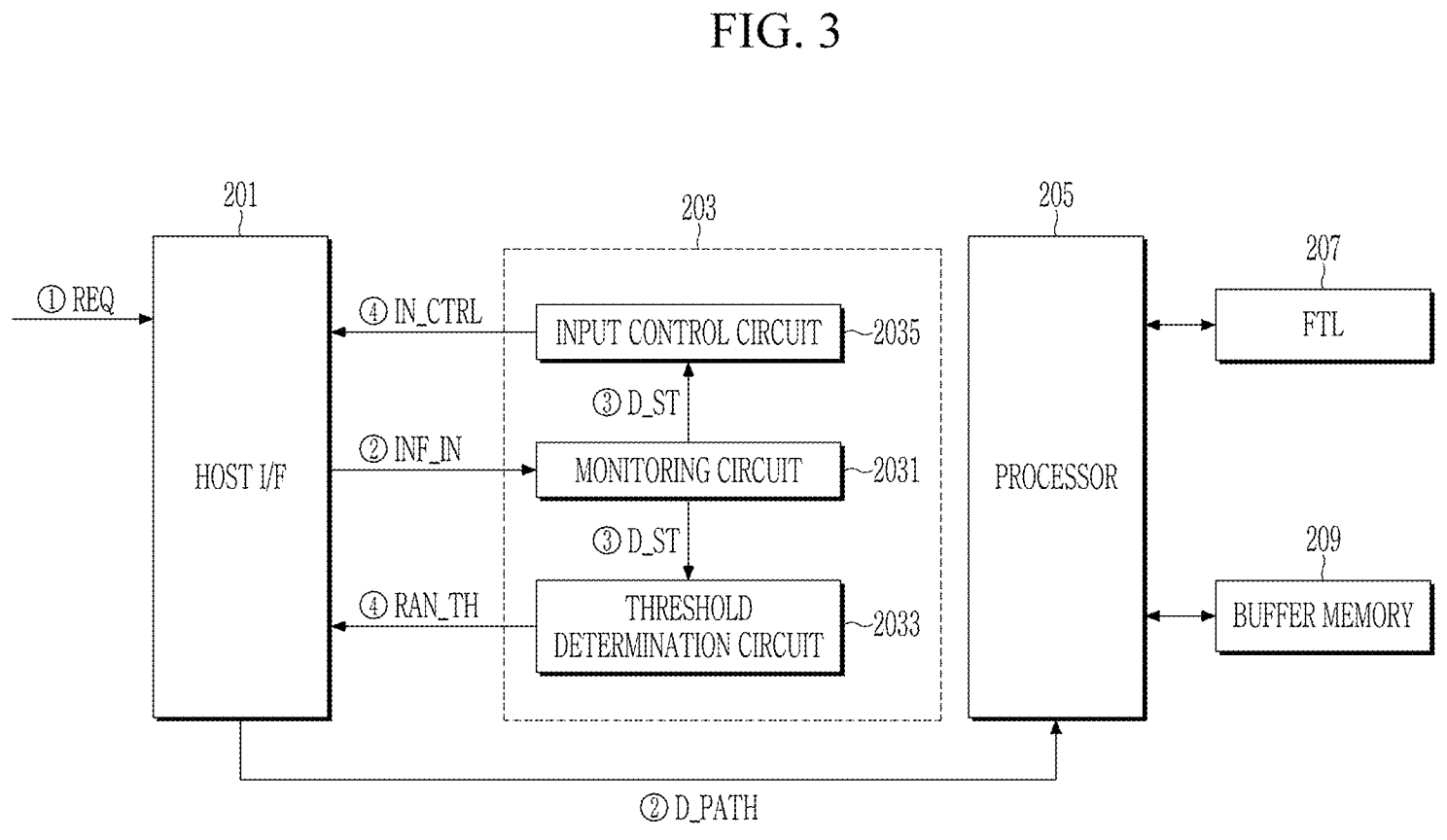

201 HOST I/F
① REQ
203
2035 INPUT CONTROL CIRCUIT
2031 MONITORING CIRCUIT
2033 THRESHOLD DETERMINATION CIRCUIT
③ D_ST
③ D_ST
④ IN_CTRL
② INF_IN
④ RAN_TH
② D_PATH
205 PROCESSOR
207 FTL
209 BUFFER MEMORY

Figure 7:
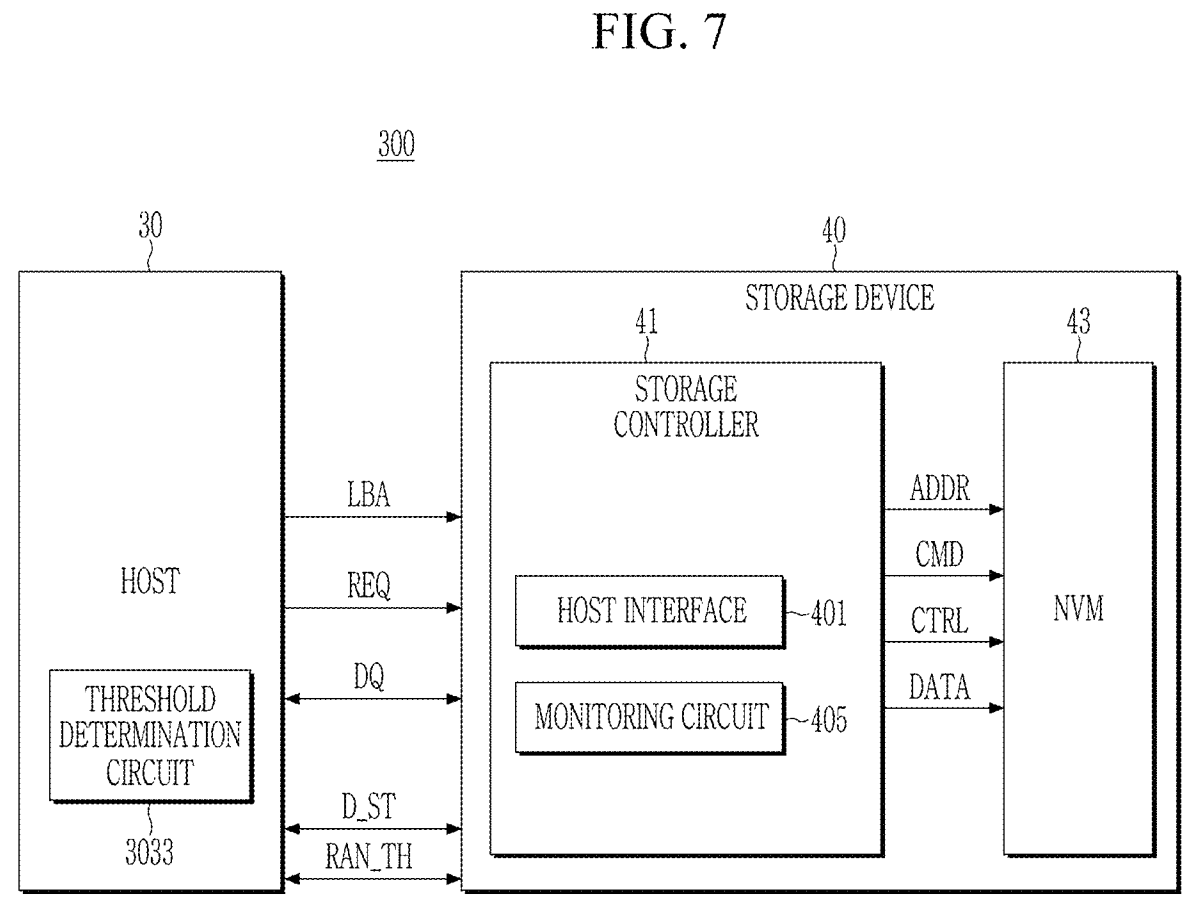

30 HOST

THRESHOLD DETERMINATION CIRCUIT 3033

LBA

REQ

DQ

D_ST

RAN_TH

40 STORAGE DEVICE

41 STORAGE CONTROLLER

HOST INTERFACE 401

MONITORING CIRCUIT 405

ADDR

CMD

CTRL

DATA

43 NVM

Figure 9:
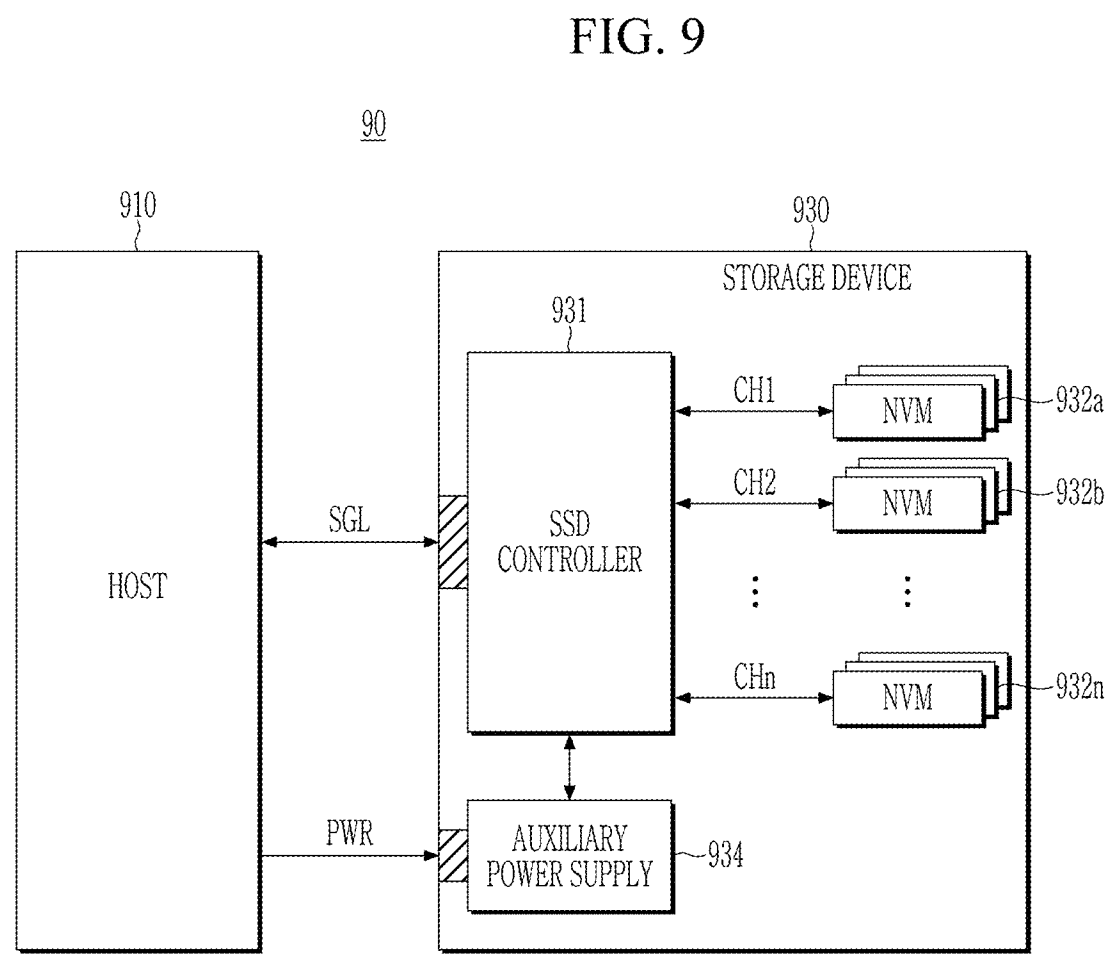

910
HOST

SGL
PWR

930
STORAGE DEVICE

931
SSD
CONTROLLER

934
AUXILIARY
POWER SUPPLY

CH1
CH2
...
CHn 932a
932b
932n
NVM
NVM
...
NVM

STORAGE DEVICE AND STORAGE SYSTEM INCLUDING THE SAME

CROSS-REFERENCE TO RELATED APPLICATION

This application claims priority to and the benefit of Korean Patent Application No. 10-2024-0019063 filed in the Korean Intellectual Property Office on Feb. 7, 2024, the entire contents of which is incorporated herein by reference.

BACKGROUND

The present disclosure relates to storage devices and storage systems including the same.

Flash memory devices have the advantages of low power consumption, high integration, small size, and being lightweight. Recently, as the use of portable information devices such as smartphones, tablet PCs, and digital cameras has rapidly increased, flash memory devices have been widely used as data storage devices.

When a file stored in a storage device is deleted from the host, the host invalidates the deleted file by processing metadata related to the deleted file. Even if a file is deleted from the host, the storage device cannot determine whether the data stored inside is data of an invalid file. Deleted files are actually marked as invalid data on the storage device. This invalid data will be recognized and managed by the storage device as valid data. Accordingly, the host may transmit a trim command containing information for specifying a region to be deleted to the storage device to notify the invalidation of files.

SUMMARY

The present disclosure provides storage devices and storage systems including the same capable of providing an improved response speed to a TRIM command of a host.

A storage device may include a plurality of non-volatile memories, a host interface configured to receive at least one packet including a TRIM command from a host device, and the host interface configured to determine a trim path for processing the TRIM command by comparing a first trim range threshold value and a trim range of the TRIM command, a trim manage module configured to generate status data by monitoring the at least one packet, the trim manage module configured to determine the first trim range threshold value based on the status data, and a processor configured to process the TRIM command based on the trim path.

An operation method of a storage device may include receiving at least one packet including a TRIM command from a host device, comparing a trim range of the TRIM command and a first trim range threshold value, the first trim range threshold value determined based on status data generated by monitoring the at least one packet, determining a trim path for processing the TRIM command based on the comparison, and processing the TRIM command based on the trim path.

A storage system may include a storage device configured to receive at least one packet and a first trim range threshold value, the at least one packet including a TRIM command from a host device, the storage device configured to generate status data by monitoring the at least one packet, determine a trim path for processing the TRIM command by comparing the first trim range threshold value and a trim range of the TRIM command, and process the TRIM command based on the trim path, and a host device configured to receive the status data from the storage device, and determine the first trim range threshold value based on the status data.

BRIEF DESCRIPTION OF THE DRAWINGS

FIG. 3 is a drawing showing a partial configuration of a storage controller according to FIG. 2.

FIG. 7 is a drawing showing a storage system according to some example embodiments.

FIG. 9 is a block diagram showing an SSD system according to some example embodiments.

DETAILED DESCRIPTION

Figure 1:
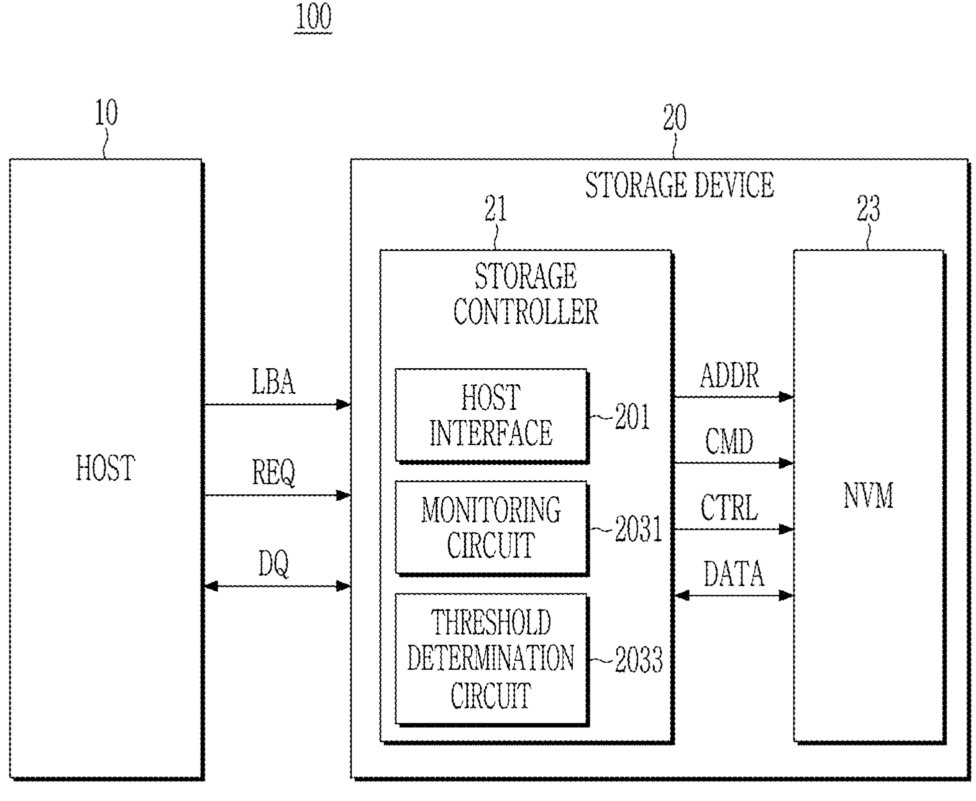
FIG. 1 is a drawing showing a storage system according to some example embodiments.

In the following detailed description, only certain example embodiments of the present disclosure have been shown and described, simply by way of illustration. As those skilled in the art would realize, the described example embodiments may be modified in various different ways, all without departing from the spirit or scope of the present disclosure.

Accordingly, the drawings and description are to be regarded as illustrative in nature and not restrictive. Like reference numerals designate like elements throughout the specification. In the flowchart described with reference to the drawings, the operation order may be changed, several operations may be merged, certain operations may be divided, and particular operations may not be performed.

In addition, expressions written in the singular may be construed in the singular or plural unless an explicit expression such as "one" or "single" is used. Terms including ordinal numbers such as first, second, and the like will be used only to describe various components, and are not to be interpreted as limiting these components. These terms may be used for the purpose of distinguishing one component from other components.

Figure 2:
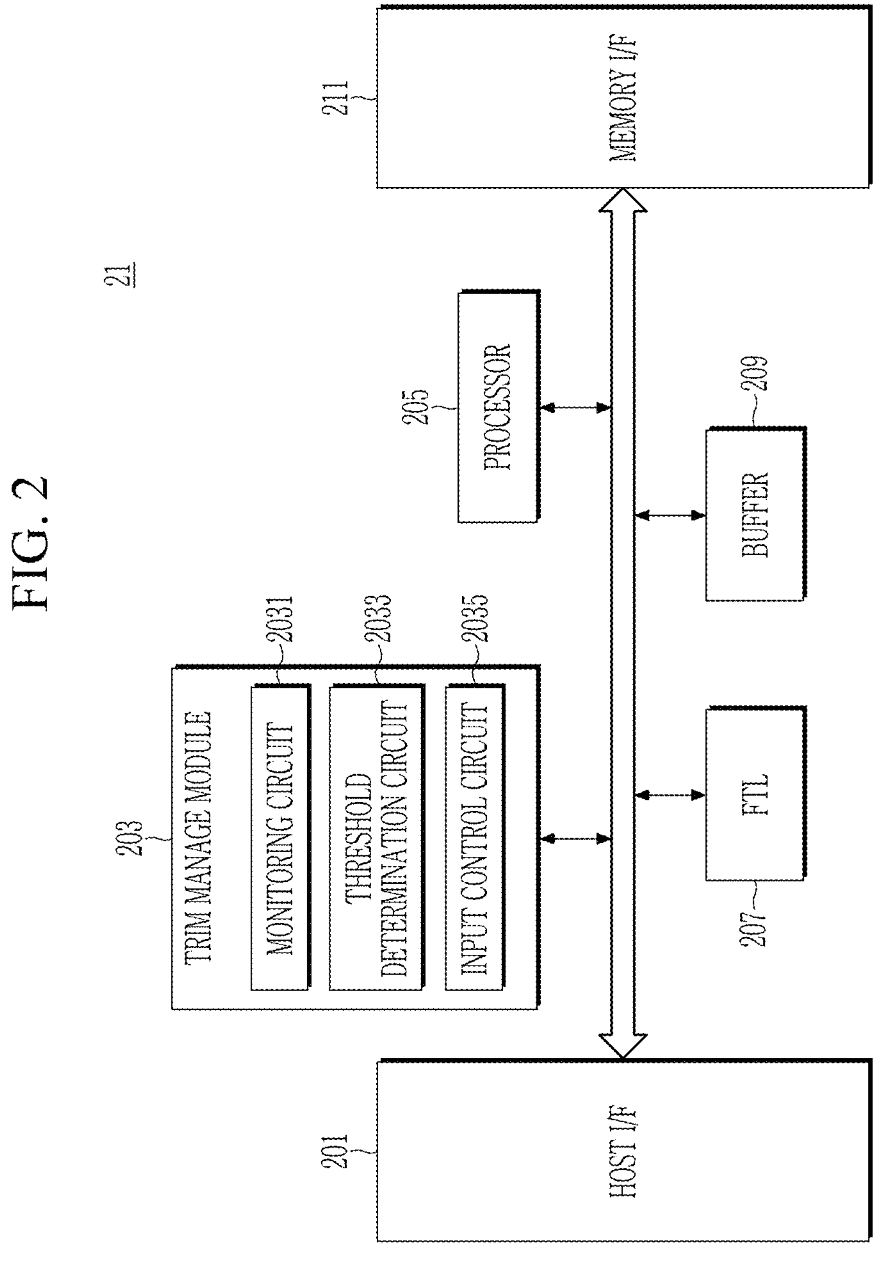
FIG. 2 is a drawing showing a storage controller according to some example embodiments.

FIG. 1 is a drawing showing a storage system according to some example embodiments. FIG. 2 is a drawing showing a storage controller according to some example embodiments.

In some example embodiments, a storage system 100 may be included in user devices such as a personal computer, a laptop computer, a server, a media player, a digital camera, or the like, or an automotive device such as a navigation, a black box, an automotive electronic device, or the like. Alternatively, the storage system 100 may be included in a mobile system such as a portable communication terminal (e.g., mobile phone), a smart phone, a tablet personal computer (tablet PC), a wearable device, a healthcare device, or an internet of things (IOT) device.

As shown in FIG. 1, the storage system 100 includes a host device 10 and a storage device 20.

The host device 10 controls an overall operation of the storage system 100.

The host device 10 may communicate with the storage device 20 through various interfaces. For example, the host device 10 may communicate with the storage device 20 through various interfaces such as universal serial bus (USB), MultiMediaCard (MMC), PCI Express (PCI-E), AT Attachment (ATA), serial AT Attachment (SATA), parallel AT Attachment (PATA), small computer system interface (SCSI), a serial attached SCSI (SAS), Enhanced Small Disk Interface (ESDI), Integrated Drive Electronics (IDE), non-volatile memory express (NVMe), or the like.

The host device 10 may provide a request signal REQ and a logical address LBA indicating a logical address to the storage device 20. In addition, the host device 10 may exchange data DQ with a storage device 20. For example, a request signal REQ may include a write command. In some example embodiments, the host device 10 may transmit the request signal REQ including the write command, a logical address LBA where the data DQ is to be written, and the data DQ to the storage device 20. The storage device 20 may write the data DQ in a block corresponding to the logical address LBA, in response to the request signal REQ.

In some example embodiments, the request signal REQ may include a TRIM command. The host device 10 may notify invalidation (or deletion) of files deleted from the host device 10 to the storage device 20 through the TRIM command. For example, the TRIM command may be a command that notifies to the storage device 20 that the data existing in a particular region of a storage device 10 is no longer used. The TRIM command may include address information for specifying a region to be deleted. The address information may include a trim range correspond to a region to be deleted. The trim range may be a range from the start point to the end point of data to be invalidated. The trim range may include at least one logical page number (LPN).

In more detail, a file system of the host device 10 may process metadata for the file to be deleted. For faster operation, the file system may change the metadata of files rather than deleting their contents. When the metadata of a deleted file is changed, the contents of the deleted file are processed as invalid data in the file system of the host device 10, while the contents of the deleted file remain as valid data in the storage device 20. Accordingly, the storage device 20 may recognize the memory block including the data of the deleted file as a valid block. Accordingly, the storage device 20 may perform unnecessary tasks, such as a garbage collection operation, on a memory block including the deleted data. To prevent or reduce in likelihood these unnecessary tasks, the host device 10 may provide the TRIM command to the storage device 20 such that the contents of the deleted file are invalidated within the storage device 20.

The storage device 20 may be accessed by the host device 10. For example, the storage device 20 may be implemented as a solid-state drive (SSD), a smart SSD, an embedded multi-media card (eMMC), an embedded universal flash storage (UFS) memory device, a UFS memory card, a Compact Flash (CF), a Secure Digital (SD), a micro Secure Digital (Micro-SD), a mini Secure Digital (Mini-SD), an extreme digital (xD), a memory stick, or a similar form.

In some example embodiments, the storage device 20 may be connected to the host device 10 through block accessible interfaces including a bus such as a serial advanced technology attachment (SATA) bus, a small computer small interface (SCSI) bus, a non-volatile memory express (NVMe) bus, a serial attached SCSI (SAS) bus, a UFS, an eMMC, or the like.

The storage device 20 may include a storage controller 21 and a non-volatile memory 23. The storage device 20 may store the data DQ or process the data DQ in response to the request signal REQ from the host device 10.

In more detail, the storage controller 21 may control an operation of the storage device 20.

Referring to FIG. 2 together with FIG. 1, the storage controller 21 may include a host interface 201, a trim manage module 203, a processor 205, flash translation layer (FTL) 207, a buffer memory 209, a memory interface 211, and the like.

The storage controller 21 may provide an address ADDR, a command CMD, a control signal CTRL, or the like to the non-volatile memory 23 in response to the logical address LBA, the request signal REQ, or the like received from the host device 10. That is, the storage controller 21 may write data DATA in the non-volatile memory 23, or read the data DATA from the non-volatile memory 23, by providing signals to the non-volatile memory 23. In addition, the storage controller 21 and the non-volatile memory 23 may exchange the data DATA.

The host interface 201 may transmit and receive packets with the host device 10. The packet transmitted from the host device 10 to the host interface 201 may include a command, data to be written in the non-volatile memory 23, a TRIM command, or the like. The packet transmitted from the host interface 201 to the host device 10 may include a response to the command, data read from the non-volatile memory 23, or the like.

The host interface 201 may generate a path determining data for selecting a trim path for processing the TRIM command based on the address information within the TRIM command and a preset trim range threshold value. The host interface 201 may indicate the method by which the TRIM command is to be processed, to the trim manage module 203 and the processor 205 through the trim path.

The trim path may include a range LPN path and/or a single LPN path. The range LPN pass may be a method in which the processor 205 entirely searches the buffer memory 209 to detect data corresponding to the received TRIM command. For example, the range LPN path may be a data detection method based on a tree structure, which is a nonlinear hierarchical structure. Specifically, the host interface 201 may repeatedly search a plurality of paths from a start point to a storage location to detect the storage location of a plurality of data corresponding to the TRIM command. Since the host interface 201 performs unnecessary searches even though it knows the storage location of the data, data detection may be delayed. When the capacity of data stored in the buffer memory 209 is large, it may take a long time to entirely search the buffer memory 209. On the other hand, when the capacity of data stored in the buffer memory 209 is small, the time required to entirely search the buffer memory 209 and the time to individually search the corresponding data within the buffer memory 209 may be similar.

The single LPN path may be a method in which the processor 205 individually searches for data corresponding to the received TRIM command within the buffer memory 209 to detect the data corresponding to the TRIM command. For example, the host interface 201 may search the storage location of data based on mapping table or the like. Since the host interface 201 may stop the search when the stored location of data is detected, the data detection speed may be fast. However, when the capacity of data stored in the buffer memory 209 is large, the time required to detect the data corresponding to the TRIM command within the buffer memory 209 may be long.

Since the TRIM command includes the trim range including at least one address, in order to invalidate all data being below specific threshold range, processing the TRIM command by using the range LPN path may be better in speed than processing the TRIM command by using the single LPN path. The single LPN path may be processed as one command with respect to each of the plurality of data. Meanwhile, the range LPN path may be processed by one command in order to detect the plurality of data included in the trim range. Therefore, the single LPN path may have a faster processing speed than the range LPN path when detecting one data. Meanwhile, the range LPN path may have a smaller overhead such as command parsing or the like than the single LPN path.

In some example embodiments, the host interface 201 may compare a size of the trim range within the address information of the TRIM command and a preset trim range threshold value. When the size of the trim range exceeds the preset trim range threshold value, the host interface 201 may select the range LPN path. Thereafter, the processor 205 may process the corresponding TRIM command through the range LPN path. Meanwhile, when the size of the trim range is smaller than or equal to the preset trim range threshold value, the host interface 201 may select the single LPN path. Thereafter, the processor 205 may process the corresponding TRIM command through the single LPN path.

The host interface 201 may transfer the command received from the host device 10 to the processor 205. In some example embodiments, the host interface 201 may apply a preset delay to the TRIM command and/or the write command under the control of a monitoring circuit 2031.

The trim manage module 203 is a module for processing the TRIM command received from the host device 10. The trim manage module 203 may control the host interface 201 based on input received from the host device 10 and a state of the storage device 20, or may determine the TRIM command processing method of the processor 205.

The trim manage module 203 may include the monitoring circuit 2031, a threshold determination circuit 2033, and an input control circuit 2035.

The monitoring circuit 2031 may generate the status data by monitoring the state of the storage device 20. For example, the monitoring circuit 2031 may generate the status data at regular or alternatively preset intervals.

The monitoring circuit 2031 may generate the status data by monitoring packet transmitted/received from the host device 10. In some example embodiments, status data may include factors affecting the performance of the storage device 20. For example, status data may include the number of write commands per unit time, the number of TRIM commands per unit time, an average latency of the write command, an average latency of the TRIM command, a maximum latency of the write command, a maximum latency of the TRIM command, a bandwidth of the TRIM command, and/or a bandwidth of the write command, or the like.

The monitoring circuit 2031 may generate the status data based on the state of configuration (e.g., the buffer memory 209 or the like) of the storage device 20. For example, the status data may include a size or the like of data stored in the buffer memory 209.

In some example embodiments, the monitoring circuit 2031 may periodically generate the status data by monitoring the state of the storage device 20. In some example embodiments, the monitoring circuit 2031 may generate the status data when the command for monitoring the state of the storage device 20 is received from the host device 10.

In some example embodiments, the monitoring circuit 2031 may determine whether the storage device 20 satisfies a performance indicator indicating the performance required for the storage device 20. The performance indicator of the storage device 20 may be preset or alternatively adjusted as desired. In some example embodiments, the performance indicator may be set based on information received from the host device 10.

In some example embodiments, the monitoring circuit 2031 may be configured to include an artificial neural network, and may be trained by using a machine learning algorithm or deep learning algorithm. For example, the neural network may be trained on status data and/or data regarding the state of configuration (e.g., the buffer memory 209 or the like) of the storage device 20 (e.g., size or the like of data stored in the buffer memory 209). For example, the learning data may include empirically generated pairs of input data that include data regarding the state of configuration of the storage device 20 and output data that includes one or more instance of status data. For example, the artificial neural network may have learned current status data and status data subsequent to the current status in advance. The monitoring circuit 2031 may predict the status data subsequent to the current status data based on the artificial neural network.

Artificial neural networks may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above, but are not limited to the above examples. The trained model may include, in addition or alternatively, software structures in addition to hardware structures. Alternatively or additionally, the monitoring circuit 2031 may implement other forms of artificial intelligence and/or machine learning based on the learning data, such as, for example, linear and/or logistic regression, statistical clustering, Bayesian classification, decision trees, dimensionality reduction such as principal component analysis, and expert systems; and/or combinations thereof, including ensembles such as random forests. Herein, an artificial neural network may have any structure that is trainable, e.g., with learning data that is used as training data.

For example, the performance indicator may include a ratio of the write command and the TRIM command received by the storage device 20.

In some example embodiments, the performance indicator may be differently set for each trim range threshold value. For example, when the trim range threshold value is 1 MiB, the TRIM command may include a condition (e.g., performance indicator) of being 11.74 kIOPS (kilo Input/Output per second) at a minimum.

In addition, the performance indicator may be differently set according to the type of command received by the storage device 20. For example, when the storage device 20 only receives the write command, the performance indicator may be differently set whenever the write command and the TRIM command are received together. For example, when only the TRIM command is received, the performance indicator may include a condition that the 1 MiB TRIM command is 8 kIOPS at a minimum. In a still another for example, when the TRIM command and the write command are received together, and the TRIM command has the size of 4 KB-750 KB, the performance indicator may include the condition that the read command is 2800 MiB/s or more, the write command is 1400 MiB/s or more, and/or the TRIM command is 1400 MiB/s or more.

The threshold determination circuit 2033 may determine the trim range threshold value based on status data.

In some example embodiments, the threshold determination circuit 2033 may determine the trim range threshold value satisfying the performance indicator. In some example embodiments, the threshold determination circuit 2033 may determine the trim range threshold value in synchronization with the period at which the monitoring circuit 2031 generates the status data.

For example, when the number of write commands per unit time increases, the threshold determination circuit 2033 may increase the trim range threshold value. Hereinafter, the trim range threshold value to be changed is referred to as a target trim range threshold value. Specifically, when the number of write commands per unit time increases, since an average latency of the write command may increase and the amount of data stored in the buffer memory 209 increases, the time required for the processor 205 entirely search the buffer memory 209 may increase. The time for the processor 205 to individually search the data corresponding to the TRIM command may be smaller than the time for entirely searching the buffer memory 209. Accordingly, the threshold determination circuit 2033 may set the target trim range threshold value to be increased from the trim range threshold value, and the host interface 201 may process the TRIM command based on the target trim range threshold value to increase the number of TRIM commands processed through the single LPN path. Accordingly, the response speed to a TRIM command of a host may be improved.

For example, when the number of TRIM commands per unit time increases, the threshold determination circuit 2033 may increase the trim range threshold value. Specifically, when the number of TRIM commands per unit time increases, the average latency of the TRIM command may increase. Accordingly, the threshold determination circuit 2033 may set the target trim range threshold value to be increased from the trim range threshold value in order to decrease latency of the TRIM command, and the host interface 201 may process the TRIM command based on the target trim range threshold value to increase the number of TRIM commands processed through the single LPN path. Accordingly, the response speed to a TRIM command of a host may be improved.

In some example embodiments, the threshold determination circuit 2033 may be configured to include an artificial neural network, and may be trained by using a machine learning algorithm or deep learning algorithm. For example, the artificial neural network may have learned the status data and the target trim range threshold value corresponding to the status data in advance. For example, the neural network may be trained on performance indicators (e.g., number of write commands per second, number of read commands per second, or number of TRIM commands per second) of the storage device 20 and/or trim range threshold values. For example, the learning data may include empirically generated pairs of input data that include performance indicators and output data that includes one or more trim range threshold values. For example, in some example embodiments, the threshold determination circuit 2033 may include an artificial neural network trained based on supervised learning. Here, the supervised learning refers to a method of training an artificial neural network with a given label for the learning data, and the label may mean the correct answer (or result value) that the artificial neural network must infer when the learning data is input to the artificial neural network. The threshold determination circuit 2033 may set the trim range threshold value corresponding to status data based on the artificial neural network.

The learning algorithm may include, for example, supervised learning, unsupervised learning, semi-supervised learning, or reinforcement learning, but is not limited to the above examples. The trained model may include one or a plurality of artificial neural network layers.

Artificial neural networks may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above, but are not limited to the above examples. The trained model may include, in addition or alternatively, software structures in addition to hardware structures. Alternatively or additionally, the threshold determination circuit 2033 may implement other forms of artificial intelligence and/or machine learning based on the learning data, such as, for example, linear and/or logistic regression, statistical clustering, Bayesian classification, decision trees, dimensionality reduction such as principal component analysis, and expert systems; and/or combinations thereof, including ensembles such as random forests. Herein, an artificial neural network may have any structure that is trainable, e.g., with learning data that is used as training data.

In some example embodiments, the threshold determination circuit 2033 may be implemented through various hardware automation circuits. That is, the threshold determination circuit 2033 may be implemented as a hardware, and a threshold value determining operation may be performed through the hardware.

The input control circuit 2035 may generate an input control signal based on status data. The input control circuit 2035 may transmit the input control signal to the host interface 201. The input control signal may be a signal to control the transfer of the command received from the host device 10 to the processor 205.

The input control circuit 2035 may generate the input control signal to control the host interface 201 to apply a delay to the TRIM command and/or the write command and transfer it to the processor 205 such that the storage device 20 may satisfy the performance indicator.

The processor 205 may control an overall operation of the storage controller 21. The processor 205 may control the storage controller 21 by driving firmware loaded in a FTL 207. In some example embodiments, the processor 205 may include a central processing unit (CPU), a controller, an application-specific integrated circuit (ASIC), and/or the like.

The processor 205 may drive various firmware or software driven in the storage controller 21. The processor 205 may use the buffer memory 209 as an operating memory of the processor 205. In addition, the processor 205 may use the non-volatile memory 23 as an operating memory of the processor 205. For example, the processor 205 may control data read operation from the non-volatile memory 23 and data write operation to the non-volatile memory 23 by executing the firmware.

In some example embodiments, the processor 205 may process the TRIM command based on the path determining data received from the host interface 201.

The FTL 207 may include firmware or software for managing data write, data read, erase operation of a subblock and/or block of the non-volatile memory 23, or the like. Firmware of the FTL 207 may be executed by the processor 205.

The FTL 207 may perform various maintenance operations for efficiently using the non-volatile memory 23. Specifically, the FTL 207 may perform various functions such as address mapping, wear leveling, and garbage collection.

The address mapping operation may be an operation of changing the logical address received from the host device 10 to the physical address in the non-volatile memory 23 used for actually storing data. Specifically, the FTL 207 may map the logical address from the host device 10 and the physical address of the non-volatile memory 23 by using an address mapping table. The address mapping operation may be an operation of converting or mapping between the logical address managed by the host device 10 and the physical address of the non-volatile memory 23.

The wear leveling may be an operation of preventing or reducing in likelihood excessive degradation of a particular block by equalizing usage frequency or usage count of a plurality of memory blocks included in the non-volatile memory 23. For example, the wear leveling operation may be implemented through firmware or hardware for balancing erase counts of physical blocks.

The garbage collection may be an operation of copying valid data of blocks of the non-volatile memory 23 to new blocks and erasing the existing blocks, thereby enabling re-use of the existing blocks, in order to secure usable capacity within the non-volatile memory 23.

In some example embodiments, the FTL 207 may store data required for performing an operation of the FTL 207. For example, the FTL 207 may store block information of the non-volatile memory 23, a garbage collection level for performing the garbage collection on the non-volatile memory 23, an address mapping table used to convert a logical address of the host device 10 to the physical address of the non-volatile memory 23, an address mapping table managed by the garbage collection or the wear leveling operation, or the like. Meanwhile, the present disclosure is not limited thereto, and the data for performing the operation of the FTL 207 may be stored in the buffer memory 209, and may be stored in the non-volatile memory 23.

The buffer memory 209 may store commands and data executed and processed by the storage controller 21. The buffer memory 209 may temporarily store data stored or to-be-stored in the non-volatile memory 23.

The buffer memory 209 may be implemented as a volatile memory such as dynamic random-access memory (DRAM), static RAM (SRAM), or the like. However, it is not limited thereto, and the buffer memory 209 may be implemented as a resistive non-volatile memory such as magnetic RAM (MRAM), phase change RAM (PRAM), resistive RAM (ReRAM), or the like, and various types of non-volatile memories such as flash memory, nano-floating gate memory (NFGM), polymer random-access memory (PoRAM), ferroelectric random-access memory (FRAM), or the like.

In some example embodiments, the buffer memory 209 may store code data required for initial booting of the storage device 20. The buffer memory 209 may buffer the logical address LBA, the request signal REQ, the data DATA, command, or the like transferred from a host 10. Signals buffered in the buffer memory 209 may be transferred to the non-volatile memory 23 through the memory interface 211 and used. For example, the data DATA buffered in the buffer memory 209 may be programmed in the non-volatile memory 23.

Although it is illustrated that the buffer memory 209 is provided inside storage controller 21, the present disclosure is not limited thereto, and the buffer memory 209 may be provided outside storage controller 21.

The memory interface 211 may provide transmitting/receiving of signals with respect to the non-volatile memory 23. The memory interface 211 may transmit commands and control signals to the non-volatile memory 23 together with data to be written in the non-volatile memory 23, or may receive data read from the non-volatile memory 23. The memory interface 211 may be implemented to comply with standard protocols such as Toggle or ONFI.

Referring back to FIG. 1, the non-volatile memory 23 may include a plurality of dies or a plurality of chips including a memory cell array. For example, the non-volatile memory 23 may include the plurality of chips, and each of the plurality of chips may include the plurality of dies. In some example embodiments, the non-volatile memory 23 may also include a plurality of channels each of which includes the plurality of chips.

The non-volatile memory 23 may include a NAND flash memory. In some other example embodiments, the non-volatile memory 23 may include electrically erasable programmable read-only memory (EEPROM), phase-change random access memory (PRAM), resistive RAM (ReRAM), resistive random-access memory (RRAM), nano-floating gate memory (NFGM), polymer random-access memory (PoRAM), magnetic random-access memory (MRAM), ferroelectric random-access memory (FRAM) or a memory similar thereto. Hereinafter, the present disclosure is described supposing that the non-volatile memory 23 is a NAND flash memory device.

Meanwhile, although FIG. 1 illustrates that one storage device 20 includes one non-volatile memory 23, the present disclosure is not limited thereto, and the storage device 20 may include a plurality of non-volatile memories.

FIG. 3 is a drawing showing a partial configuration of a storage controller according to FIG. 2.

The host interface 201 may receive the request signal REQ from the host device 10 (see FIG. 1). In some example embodiments, the request signal REQ may include the TRIM command.

The host interface 201 may compare the trim range included in the TRIM command and the preset trim range threshold value. The host interface 201 may generate the path determining data D_PATH based on results of comparing the trim range and the preset trim range threshold value. The host interface 201 may transfer the path determining data D_PATH to the processor 205.

The host interface 201 may transfer an input information INF_IN to the monitoring circuit 2031. The input information INF_IN may be information regarding packets transmitted/received from the host device 10. For example, the input information INF_IN may include information on flow of the TRIM command and the write command received from the host device 10, or the like.

The monitoring circuit 2031 may generate the status data D_ST. Specifically, the monitoring circuit 2031 may generate the status data D_ST based on the input information INF_IN. In addition, the monitoring circuit 2031 may generate the status data D_ST based on a state of the processor 205 and the buffer memory 209. The monitoring circuit 2031 may transfer the status data D_ST to the input control circuit 2035 and the threshold determination circuit 2033.

The threshold determination circuit 2033 may determine a trim range threshold value RAN_TH based on the status data D_ST.

In some example embodiments, the threshold determination circuit 2033 may determine whether a modification of the preset trim range threshold value is required based on the status data D_ST. Specifically, the threshold determination circuit 2033 may determine whether the storage device 20 satisfies the preset performance indicator based on the status data D_ST. When the storage device 20 satisfies the preset performance indicator, the threshold determination circuit 2033 may determine that the modification of the preset trim range threshold value is not required and the preset trim range threshold value is to be maintained.

Meanwhile, when the storage device 20 does not satisfy the preset performance indicator, the threshold determination circuit 2033 may determine that the modification of the preset trim range threshold value is required. The threshold determination circuit 2033 may generate the target trim range threshold value RAN_TH based on the status data D_ST. In some example embodiments, the threshold determination circuit 2033 may generate the target trim range threshold value RAN_TH by using an artificial neural network trained in advance as described above.

The threshold determination circuit 2033 may transfer the target trim range threshold value RAN_TH to the host interface 201. The host interface 201 may process the TRIM command based on the target trim range threshold value RAN_TH, and generate the path determining data D_PATH.

The input control circuit 2035 may determine whether it is necessary to control the host interface 201 such that the input information INF_IN is changed based on the status data D_ST. When it is determined that it is necessary to control the host interface 201, the input control circuit 2035 may generate an input control signal IN_CTRL based on the input information INF_IN and the status data D_ST. For example, the input control signal IN_CTRL may be a signal to control the host interface 201 such that the ratio of the TRIM command or the write command may satisfy a preset reference, by applying a preset or desired delay to the write command and/or the TRIM command received from the host device 10. The input control circuit 2035 may transmit the input control signal IN_CTRL to the host interface 201.

The processor 205 may process the TRIM command received from the host device 10 based on the path determining data D_PATH received from the host interface 201. Specifically, when the data corresponding to the TRIM command are stored in the buffer memory 209, the processor 205 may process the TRIM command based on the path determining data D_PATH. Meanwhile, when the data corresponding to the TRIM command are stored in the non-volatile memory 23, the processor 205 may process the TRIM command based on mapping data stored in the FTL 207. In some example embodiments, when a part of the data corresponding to the TRIM command is stored in the non-volatile memory 23 and another part is stored in the buffer memory 209, the processor 205 may process the TRIM command based on the mapping data stored in the FTL 207 and the path determining data D_PATH.

When the path determining data D_PATH indicates the range LPN path, the processor 205 may detect the data corresponding to the received TRIM command by entirely searching the data stored in the buffer memory 209.

When the path determining data D_PATH indicates the single LPN path, the processor 205 may search the data corresponding to the TRIM command among data stored in the buffer memory 209.

Figure 4:
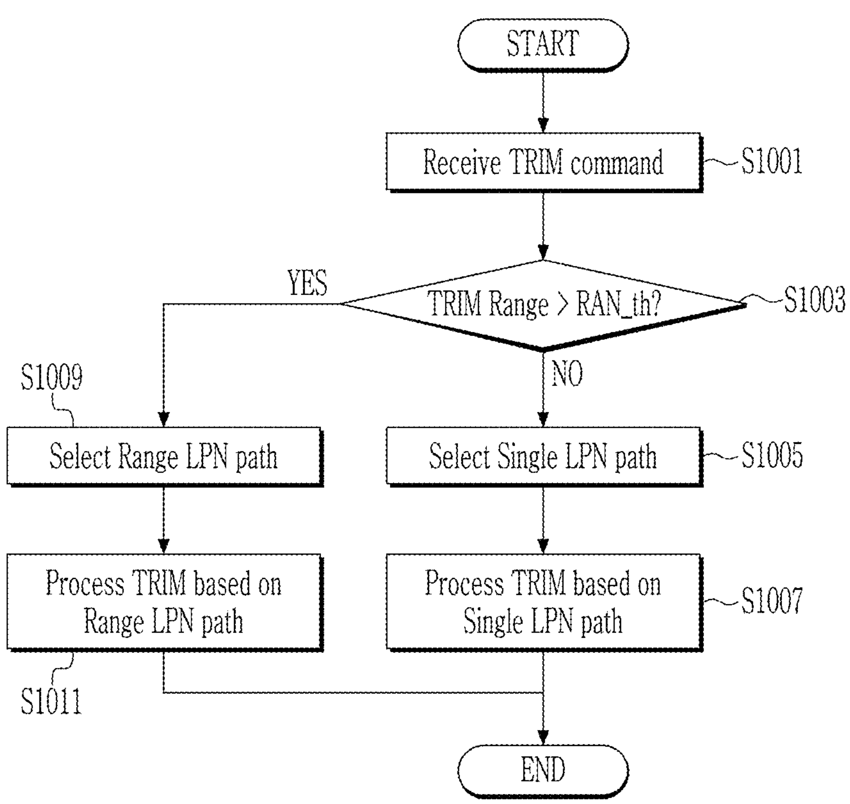
FIG. 4 is a drawing showing an operation method of a storage device according to some example embodiments.

FIG. 4 is a drawing showing an operation method of a storage device according to some example embodiments.

First, at step S1001, the host interface 201 may receive the TRIM command from the host device 10 (see FIG. 1). The TRIM command may include address information.

At step S1003, the host interface 201 may compare the trim range with the preset or determined trim range threshold value RAN_TH.

In more detail, the host interface 201 may derive the trim range, that is, a range from the start point to the end point of the data to be invalidated based on the address information. The host interface 201 may compare the trim range and the preset determined trim range threshold value RAN_TH.

At step S1005, when the trim range is not larger than the preset or determined trim range threshold value RAN_TH, the host interface 201 may select the single LPN path with respect to the TRIM command.

The host interface 201 may transfer the TRIM command to the processor 205 together with the path determining data D_PATH indicating the single LPN path.

Thereafter, at step S1007, the processor 205 may process the TRIM command based on the single LPN path.

In more detail, the processor 205 may detect the data corresponding to the TRIM command by individually searching the data stored in the buffer memory 209. In addition, the processor 205 may detect data stored in the non-volatile memory 23 (see FIG. 1) based on an address mapping table of the FTL 207. The processor 205 may invalidate data detected from the buffer memory 209 and the non-volatile memory 23.

At step S1009, when the trim range is greater than the preset trim range threshold value, the processor 205 may select the range LPN path with respect to the TRIM command.

The host interface 201 may transfer the TRIM command to the processor 205 together with the path determining data D_PATH indicating the range LPN path.

Thereafter, at step S1011, the processor 205 may process the TRIM command based on the range LPN path.

In more detail, the processor 205 may detect the data corresponding to the TRIM command by entirely searching the data stored in the buffer memory 209. In addition, the processor 205 may detect the data stored in the non-volatile memory 23 based on the address mapping table of the FTL 207. The processor 205 may invalidate data detected from the buffer memory 209 and the non-volatile memory 23.

Figure 5:
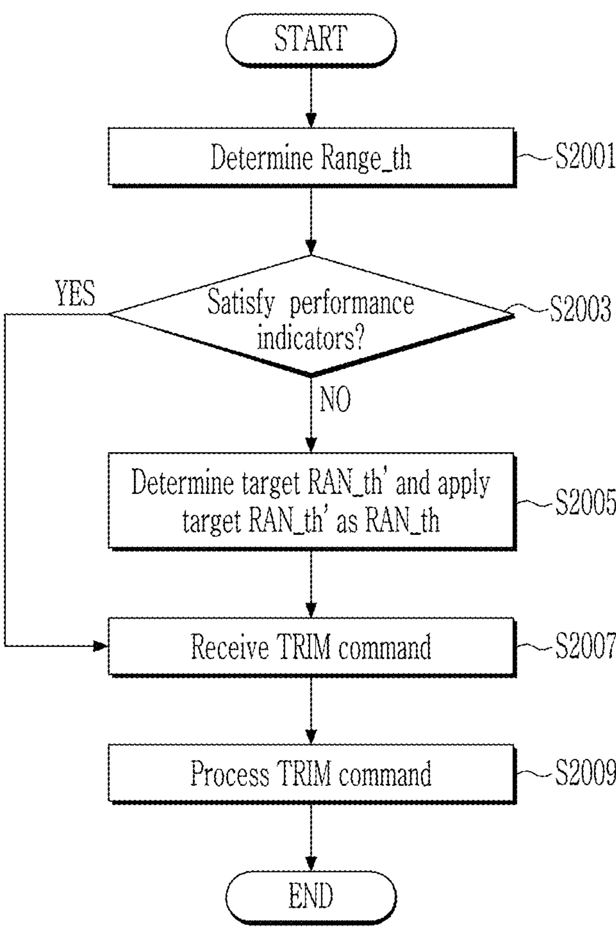
FIG. 5 is a drawing showing an operation method of a storage device according to some example embodiments.

FIG. 5 is a drawing showing an operation method of a storage device according to some example embodiments.

First, at step S2001, the threshold determination circuit 2033 may determine the trim range threshold value RAN_TH.

In more detail, the threshold determination circuit 2033 may determine the trim range threshold value RAN_TH based on status data of the storage device 20.

At step S2003, the monitoring circuit 2031 may determine whether the storage device 20 satisfies the performance indicator.

When the monitoring circuit 2031 determines that the performance indicator is satisfied, the host interface 201 may perform a step S2007 of receiving the TRIM command.

Thereafter, at step S2009, the host interface 201 may process the TRIM command. At this time, the host interface 201 may process the TRIM command based on the preset trim range threshold value RAN_TH.

At step S2005, when it is determined that the monitoring circuit 2031 does not satisfy the performance indicator, the threshold determination circuit 2033 is configured to determine the target trim range threshold value (RAN_TH'), and apply the target trim range threshold value (RAN_TH') as the trim range threshold value RAN_TH.

In some example embodiments, when it is determined that the monitoring circuit 2031 does not satisfy the performance indicator, the monitoring circuit 2031 may determine that it is necessary to modify input information input from the host interface 201. Accordingly, the monitoring circuit 2031 may control the input control circuit 2035 to transfer the command received from the host device 10 to the processor 205.

The threshold determination circuit 2033 may determine the trim range threshold value RAN_TH based on status data of the storage device 20.

Thereafter, at step S2007, the host interface 201 may receive the TRIM command.

The host interface 201 may, at step S2009, process the TRIM command based on the preset trim range threshold value RAN_TH.

Figure 6:
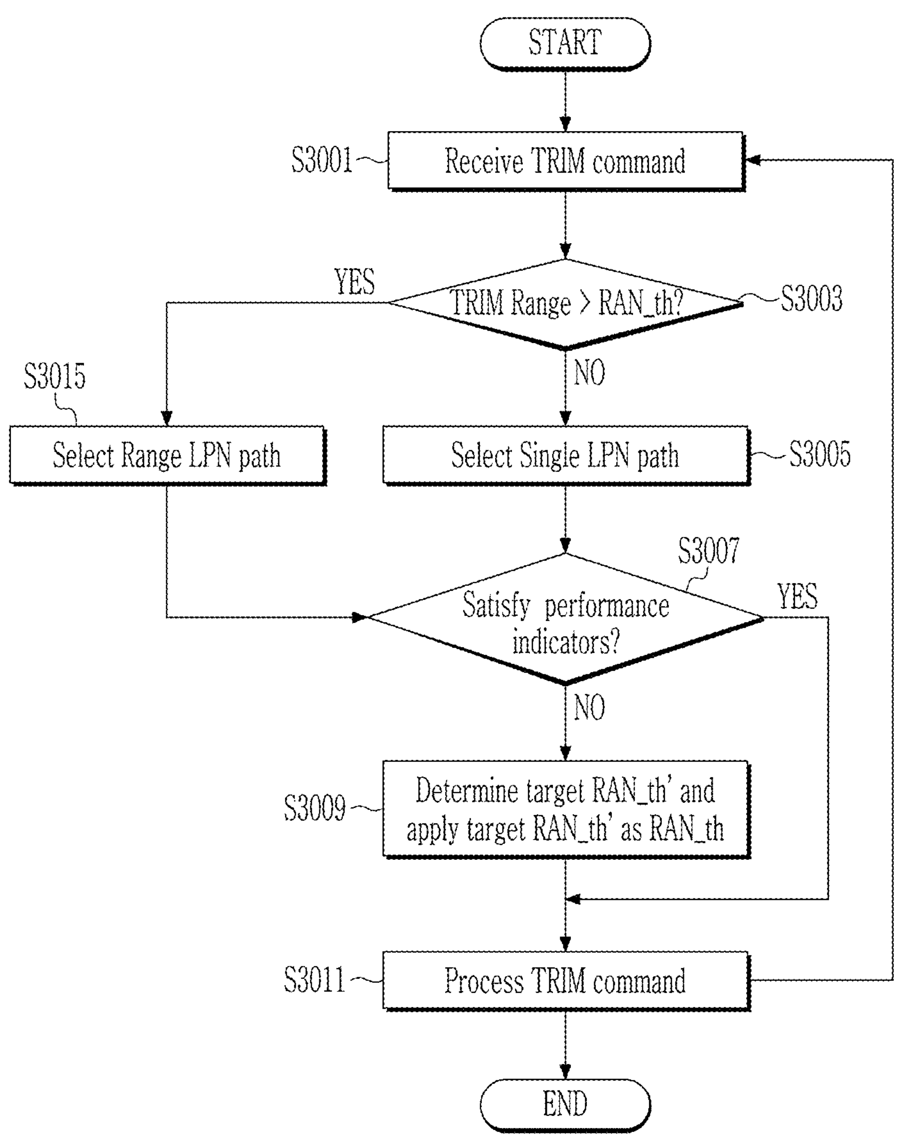
FIG. 6 is a drawing showing an operation method of a storage device according to some example embodiments.

FIG. 6 is a drawing showing an operation method of a storage device according to some example embodiments.

First, at step S3001, the host interface 201 may receive the TRIM command from the host device 10 (see FIG. 1). The TRIM command may include address information.

At step S3003, the host interface 201 may compare the trim range with the preset trim range threshold value RAN_TH.

In more detail, the host interface 201 may derive the trim range, that is, a range from the start point to the end point of the data to be invalidated based on the address information. The host interface 201 may compare the trim range and the preset or determined trim range threshold value RAN_TH.

At step S3005, when the trim range is not larger than the preset trim range threshold value RAN_TH, the host interface 201 may select the single LPN path with respect to the TRIM command.

The host interface 201 may transfer the TRIM command to the processor 205 together with the path determining data D_PATH indicating the single LPN path.

At step S3007, the monitoring circuit 2031 may determine whether the storage device 20 satisfies the performance indicator.

At step S3011, when the monitoring circuit 2031 determines that the performance indicator is satisfied, the processor 205 may process the TRIM command. At this time, the processor 205 may process the TRIM command based on the single LPN path.

In more detail, the processor 205 may detect the data corresponding to the TRIM command by individually searching the data stored in the buffer memory 209. In addition, the processor 205 may detect the data stored in the non-volatile memory 23 based on the address mapping table of the FTL 207. The processor 205 may invalidate data detected from the buffer memory 209 and the non-volatile memory 23.

At step S3009, when it is determined that the monitoring circuit 2031 does not satisfy the performance indicator, the threshold determination circuit 2033 is configured to determine the target trim range threshold value (RAN_TH'), and apply the target trim range threshold value (RAN_TH') as the trim range threshold value RAN_TH.

The threshold determination circuit 2033 may determine the trim range threshold value RAN_TH based on status data of the storage device 20. For example, the threshold determination circuit 2033 may determine the target trim range threshold value (RAN_TH') based on status data of the storage device 20.

The host interface 201 may process the TRIM command received at the step S3001 based on the preset trim range threshold value RAN_TH. For example, subsequent to a determination that the monitoring circuit 2031 does not satisfy the performance indicator and the target trim range threshold value (RAN_TH') is applied as a new trim range threshold value RAN_TH, the host interface 201 may process the TRIM command received at the step S3001 based on the new trim range threshold value RAN_TH.

Thereafter, at step S3011, for example, after it has been determined that the monitoring circuit 2031 satisfies the performance indicator, the processor 205 may process the TRIM command. At this time, the processor 205 may process the TRIM command based on the single LPN path.

At step S3015, when the trim range is greater than the preset trim range threshold value RAN_TH, the processor 205 may select the range LPN path with respect to the TRIM command.

The host interface 201 may transfer the TRIM command to the processor 205 together with the path determining data D_PATH indicating the range LPN path.

At step S3007, the monitoring circuit 2031 may determine whether the storage device 20 satisfies the performance indicator.

At step S3011, when the monitoring circuit 2031 determines that the performance indicator is satisfied, the processor 205 may process the TRIM command. At this time, the processor 205 may process the TRIM command based on the range LPN path.

In more detail, the processor 205 may detect the data corresponding to the TRIM command by entirely searching the data stored in the buffer memory 209. In addition, the processor 205 may detect the data stored in the non-volatile memory 23 based on the address mapping table of the FTL 207. The processor 205 may invalidate data detected from the buffer memory 209 and the non-volatile memory 23.

At step S3009, when it is determined that the monitoring circuit 2031 does not satisfy the performance indicator, the threshold determination circuit 2033 is configured to determine the target trim range threshold value (RAN_TH'), and apply the target trim range threshold value (RAN_TH') as the trim range threshold value RAN_TH.

The threshold determination circuit 2033 may determine the trim range threshold value RAN_TH based on status data of the storage device 20. For example, the threshold determination circuit 2033 may determine the target trim range threshold value (RAN_TH') based on status data of the storage device 20.

The host interface 201 may process the TRIM command received at the step S3001 based on the preset trim range threshold value RAN_TH. For example, subsequent to a determination that the monitoring circuit 2031 does not satisfy the performance indicator and the target trim range threshold value (RAN_TH') is applied as a new trim range threshold value RAN_TH, the host interface 201 may process the TRIM command received at the step S3001 based on the new trim range threshold value RAN_TH.

Thereafter, at step S3011, for example, after it has been determined that the monitoring circuit 2031 satisfies the performance indicator, the processor 205 may process the TRIM command. At this time, the processor 205 may process the TRIM command based on the range LPN path.

FIG. 7 is a drawing showing a storage system according to some example embodiments.

As shown in FIG. 7, the storage system 300 includes a host device 30 and a storage device 40.

The host device 30 controls an overall operation of the storage system 300.

The host device 30 may provide a request signal REQ and a logical address LBA indicating a logical address to the storage device 40. In addition, the host device 30 may exchange the data DQ with the storage device 40.

For example, the request signal REQ may include the write command. In some example embodiments, the host device 30 may transmit the request signal REQ including the write command, the logical address LBA where the data DQ is to be written, and the data DQ to the storage device 40. The storage device 40 may write the data DQ in a block corresponding to the logical address LBA, in response to the request signal REQ.

For example, the request signal REQ may include the TRIM command. The host device 30 may notify invalidation (or deletion) files as needed through the TRIM command. For example, the TRIM command may be a command that notifies to the storage device 40 that the data existing in a particular region of the storage device 40 is no longer used. The TRIM command may include address information for specifying a region to be deleted. For example, the address information may include a trim range correspond to a region to be deleted.

The host device 30 may receive the status data D_ST of the storage device 40 from the storage device 40. The status data D_ST may include factors affecting the performance of the storage device 40.

The host device 30 may include a threshold determination circuit 3033. The threshold determination circuit 3033 may determine the trim range threshold value RAN_TH of the storage device 40 based on status data. The host device 30 may transmit the determined trim range threshold value RAN_TH to the storage device 40.

The storage device 40 may be accessed by the host device 30. For example, the storage device 40 may be implemented as a solid-state drive (SSD), a smart SSD, an embedded multi-media card (eMMC), an embedded universal flash storage (UFS) memory device, a UFS memory card, a Compact Flash (CF), a Secure Digital (SD), a micro Secure Digital (Micro-SD), a mini Secure Digital (Mini-SD), an extreme digital (xD), a memory stick, or a similar form.

In some example embodiments, the storage device 40 may be connected to the host device 30 through block accessible interfaces including a bus such as a serial advanced technology attachment (SATA) bus, a small computer small interface (SCSI) bus, a non-volatile memory express (NVMe) bus, a serial attached SCSI (SAS) bus, a UFS, an eMMC, or the like.

The storage device 40 may include a storage controller 41 and a non-volatile memory 43. The storage device 40 may store the data DQ or process the data DQ in response to the request signal REQ from the host device 30.

In more detail, the storage controller 41 may control an operation of the storage device 40.

The storage controller 41 may include a host interface 401 and a monitoring circuit 4031, or the like.

The storage controller 41 may provide the address ADDR, the command CMD, the control signal CTRL, or the like to the non-volatile memory 43 in response to the logical address LBA, the request signal REQ, or the like received from the host device 30. That is, the storage controller 41 may write data DATA in the non-volatile memory 43, or read the data DATA from the non-volatile memory 43, by providing signals to the non-volatile memory 43. In addition, the storage controller 41 and the non-volatile memory 43 may exchange the data DATA.

The host interface 401 may transmit and receive packets with the host device 30. The packet transmitted from the host device 30 to the host interface 401 may include a command, data to be written in the non-volatile memory 43, or the like. The packet transmitted from the host interface 401 to the host device 30 may include a response to the command, data read from the non-volatile memory 43, or the like.

The host interface 401 may process the TRIM command received from the host device 30 based on the trim range threshold value RAN_TH received from the host device 30. The host interface 401 may generate a path determining data for selecting the trim path based on the trim range threshold value RAN_TH. The host interface 401 may indicate the method by which the TRIM command is to be processed, to the processor through the trim path.

The monitoring circuit 405 may generate the status data by monitoring a state of the storage device 40.

The monitoring circuit 405 may generate the status data based on input information received from the host device 30. The input information may be information regarding packets transmitted/received from the host device 30.

The monitoring circuit 405 may generate the status data based on the state of configuration (e.g., a buffer memory, or the like) of the storage device 40. For example, the status data may include a size or the like of data stored in the buffer memory.

In some example embodiments, the monitoring circuit 405 may generate the status data by periodically monitoring the state of the storage device 40. In some example embodiments, the monitoring circuit 405 may generate the status data when the command for monitoring the state of the storage device 40 is received from the host device 30.

In some example embodiments, the monitoring circuit 405 may determine whether the storage device 40 satisfies the performance indicator. The performance indicator of the storage device 40 may be preset or otherwise desired. In some example embodiments, the performance indicator may be set based on information received from the host device 30. For example, the performance indicator may include a ratio of the write command and the TRIM command received by the storage device 40.

The monitoring circuit 405 may transmit the status data D_ST to the host device 30.

The non-volatile memory 43 may include a plurality of dies or a plurality of chips including a memory cell array. For example, the non-volatile memory 43 may include the plurality of chips, and each of the plurality of chips may include the plurality of dies. In some example embodiments, the non-volatile memory 43 may also include a plurality of channels each of which includes the plurality of chips.

The non-volatile memory 43 may include a NAND flash memory. In some other example embodiments, the non-volatile memory 43 may include electrically erasable programmable read-only memory (EEPROM), phase-change random access memory (PRAM), resistive RAM (ReRAM), resistive random-access memory (RRAM), nano-floating gate memory (NFGM), polymer random-access memory (PoRAM), magnetic random-access memory (MRAM), ferroelectric random-access memory (FRAM) or a memory similar thereto.

Figure 8:
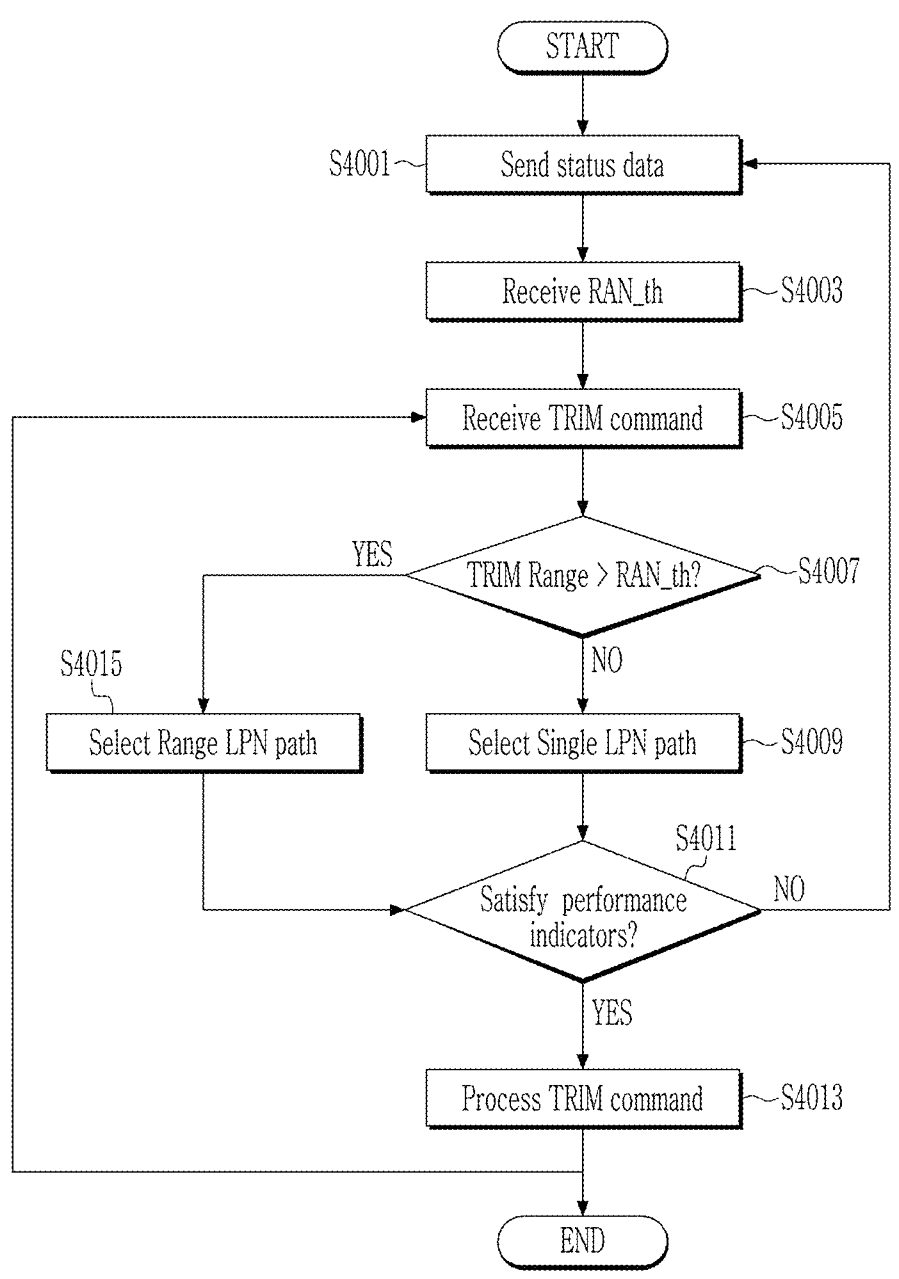
FIG. 8 is a drawing showing an operation method of a storage device according to FIG. 7.

FIG. 8 is a drawing showing an operation method of a storage device according to FIG. 7.

First, at step S4001, the monitoring circuit 405 may transmit the status data D_ST to the host device 30.

At step S4003, the host interface 401 may receive the trim range threshold value RAN_TH.

In some example embodiments, the host device 30 may determine the trim range threshold value RAN_TH based on the status data D_ST.

At step S4005, the host interface 401 may receive the TRIM command from the host device 30. The TRIM command may include address information.

At step S4007, the host interface 401 may compare the trim range with the trim range threshold value RAN_TH.

In more detail, the host interface 401 may derive the trim range, that is, a range from the start point to the end point of the data to be invalidated based on the address information in the TRIM command. The host interface 401 may compare the trim range and the preset trim range threshold value.

At step S4009, when the trim range is not larger than the preset trim range threshold value RAN_TH, the host interface 401 may select the single LPN path with respect to the TRIM command.

The host interface 401 may transfer the TRIM command to the processor together with the path determining data D_PATH indicating the single LPN path.

At step S4011, the monitoring circuit 4031 may determine whether the storage device 40 satisfies the performance indicator.

At step S4013, when the monitoring circuit 4031 determines that the performance indicator is satisfied, the processor may process the TRIM command. At this time, the processor may process the TRIM command based on the single LPN path.

At step S4001, when it is determined that the monitoring circuit 4031 does not satisfy the performance indicator, the monitoring circuit 4031 may transmit the status data D_ST to the host device 30.

Thereafter, the host device 30 may determine the target trim range threshold value such that the storage device 40 may satisfy the performance indicator, and may transmit the target trim range threshold value to the storage device 40 as the trim range threshold value RAN_TH. For example, the host device 30 may determine the target trim range threshold value (RAN_TH'), and may transmit the target trim range threshold value (RAN_TH') as the trim range threshold value RAN_TH.

The storage device 40 may perform again the step S4003 of receiving the changed trim range threshold value RAN_TH. For example, subsequent to a determination that the monitoring circuit 4031 does not satisfy the performance indicator and the target trim range threshold value (RAN_TH') is applied as a changed trim range threshold value RAN_TH, the host interface 401 may receive the new trim range threshold value RAN_TH according to step S4003 and compare the trim range with the changed trim range threshold value RAN_TH according to step S4007. For example, the monitoring circuit 4031 may subsequently determine that the storage device 40 satisfies the performance indicator according to step S4011 and the processor may process the TRIM command according to step 4013.

At step S4015, when the trim range is greater than the preset trim range threshold value RAN_TH, the processor may select the range LPN path with respect to the TRIM command.

The host interface 401 may transfer the TRIM command to the processor together with the path determining data D_PATH indicating the range LPN path.

At step S4007, the monitoring circuit 4031 may determine whether the storage device 40 satisfies the performance indicator.

At step S4011, when the monitoring circuit 4031 determines that the performance indicator is satisfied, the processor may process the TRIM command. At this time, the processor may process the TRIM command based on the range LPN path.

At step S4001, when it is determined that the monitoring circuit 4031 does not satisfy the performance indicator, the monitoring circuit 4031 may transmit the status data D_ST to the host device 30.

Thereafter, the host device 30 may determine the target trim range threshold value such that the storage device 40 may satisfy the performance indicator, and may transmit the target trim range threshold value to the storage device 40 as the trim range threshold value RAN_TH. For example, the host device 30 may determine the target trim range threshold value (RAN_TH'), and may transmit the target trim range threshold value (RAN_TH') as the trim range threshold value RAN_TH.

The storage device 40 may perform again the step S4003 of receiving the changed trim range threshold value RAN_TH. For example, subsequent to a determination that the monitoring circuit 4031 does not satisfy the performance indicator and the target trim range threshold value (RAN_TH') is applied as a changed trim range threshold value RAN_TH, the host interface 401 may receive the new trim range threshold value RAN_TH according to step S4003 and compare the trim range with the changed trim range threshold value RAN_TH according to step S4007. For example, the monitoring circuit 4031 may subsequently determine that the storage device 40 satisfies the performance indicator according to step S4011 and the processor may process the TRIM command according to step 4013.

At step S4013, when the monitoring circuit 4031 determines that the performance indicator is satisfied, the processor may process the TRIM command. At this time, the processor may process the TRIM command based on the range LPN path.

FIG. 9 is a block diagram showing an SSD system according to some example embodiments.

Referring to FIG. 9, an SSD system 90 may include a host 910 and an SSD 930.

The host 910 may write data in the SSD 930, or read data stored in the SSD 930. The host 910 may transmit a signal SGL of commands, addresses, control signals, or the like to the SSD 930.

The SSD 930 may exchange the signal SGL with the host 910 through a host interface, and receive power through a power connector 9221. The SSD 930 may include a plurality of non-volatile memories **932*a* to 932*n*, an SSD controller 931, and an auxiliary power supply 934. Here, the plurality of non-volatile memories 932*a* to 932*n*** may be implemented as not only a NAND flash memory but also PRAM, MRAM, ReRAM, FRAM, or the like.

The plurality of non-volatile memories **932*a* to 932*n* may be used as a storage medium of the SSD 930. The plurality of non-volatile memories 932*a* to 932*n* may be connected to the SSD controller 931** through the plurality of channels CH1 to CHn. One or more non-volatile memories may be connected to one channel. The non-volatile memory connected to one channel may be connected to the same data bus.

The SSD controller 931 may exchange the signal SGL with the host 910 through the host interface. Here, the signal SGL may include a command, address, data, or the like. The SSD controller 931 may write data in corresponding non-volatile memory, or read data from corresponding non-volatile memory, according to a command of the host 910.

In some example embodiments, the SSD controller 931 may be a storage controller described with reference to FIG. 1 to FIG. 8. The SSD controller 931 may include a trim manage module and a processor.

The trim manage module may manage the TRIM command received from the host 910. Specifically, the trim manage module may generate the status data based on a state of the SSD 930. In some example embodiments, the trim manage module may determine the trim range threshold value based on status data. The host interface may determine processing method of the received TRIM command based on the trim range threshold value. The processor may process the received TRIM command based on the determined processing method. Specifically, when the trim range of the received TRIM command is greater than the trim range threshold value, the host interface may determine such that the processor processes the corresponding TRIM command by using the range LPN path. When the trim range of the received TRIM command is smaller than the trim range threshold value, the host interface may determine such that the processor processes the corresponding TRIM command by using the single LPN path.

The trim manage module may determine whether the SSD 930 satisfies the preset performance indicator. In some example embodiments, when the SSD 930 does not satisfy the performance indicator, the trim manage module may apply delay to packets or the like received from the host 910. In some example embodiments, when the SSD 930 does not satisfy the performance indicator, the trim manage module may change the preset trim range threshold value.

Accordingly, the SSD 930 according to some example embodiments may satisfy the performance required by the SSD 930, and rapidly process the TRIM command.

The auxiliary power supply 934 may be connected to the host 910 through a power connector. The auxiliary power supply 934 may receive a power PWR from the host 910, and be charged. Meanwhile, the auxiliary power supply 934 may be located inside the SSD 930, and may be located outside the SSD 930. For example, the auxiliary power supply 934 may be located on a main board, and may provide an auxiliary power to the SSD 930.

Any or all of the elements described with reference to the figures may communicate with any or all other elements described with reference to the respective figures. For example, any element may engage in one-way and/or two-way and/or broadcast communication with any or all other elements, to transfer and/or exchange and/or receive information such as but not limited to data and/or commands, in a manner such as in a serial and/or parallel manner, via a bus such as a wireless and/or a wired bus (not illustrated). The information may be in encoded various formats, such as in an analog format and/or in a digital format.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

As described above, some example embodiments have been disclosed in the drawings and the specification. Although specific terms have been used herein, they are used only for the purpose of describing the present disclosure and are not used to limit the scope of the present disclosure as defined in the meaning or claims. Therefore, those skilled in the art will understand that various modifications and other equivalent embodiments of the present disclosure are possible. Therefore, the true technical protective scope of the present disclosure must be determined based on the technical spirit of the appended claims.

What is claimed is:

1. A storage device, comprising:

a plurality of non-volatile memories;

a host interface configured to receive at least one packet including a TRIM command from a host device, the host interface configured to determine that a trim path for processing the TRIM command is a single logical page number (LPN) path or a range LPN path by comparing a first trim range threshold value and a trim range of the TRIM command;

a trim manage module configured to generate status data by monitoring the at least one packet, the trim manage module configured to determine the first trim range threshold value based on the status data; and a processor configured to process the TRIM command based on the trim path.

2. The storage device of claim 1, further comprising:

a buffer memory configured to store a plurality of first data, wherein the processor is configured to detect a plurality of second data corresponding to the TRIM command among the plurality of first data based on the trim path, and process the TRIM command by invalidating the plurality of second data.

3. The storage device of claim 2, wherein the trim path comprises:

the range LPN path configured to detect the plurality of second data by entirely searching the plurality of first data; and the single LPN path configured to detect the plurality of second data by individually searching each of the plurality of second data among the plurality of first data.

4. The storage device of claim 3, wherein:

the host interface is configured to determine the single LPN path as the trim path in response to the trim range being greater than the first trim range threshold value; and the host interface is configured to determine the range LPN path as the trim path in response to the trim range is smaller than the first trim range threshold value.

5. The storage device of claim 1, wherein:

the trim manage module is configured to determine whether the storage device satisfies a performance indicator for the storage device; and in response to the storage device not satisfying the performance indicator, the trim manage module is configured to determine a second trim range threshold value based on the status data, and the host interface is configured to determine the trim path based on the second trim range threshold value.

6. The storage device of claim 5, wherein:

the trim manage module includes an artificial neural network in which status data and trim range threshold values corresponding to the status data are learned in advance; and the trim manage module is configured to determine the second trim range threshold value using the artificial neural network.

7. The storage device of claim 5, wherein the performance indicator is set according to the second trim range threshold value and a type of command included in the at least one packet.

8. The storage device of claim 1, wherein the trim manage module is configured to generate the status data at intervals.

9. The storage device of claim 1, wherein the status data includes a number of write commands per unit time and a number of TRIM commands per unit time.

10. The storage device of claim 1, wherein the host interface is configured to transfer the at least one packet to the processor, and the trim manage module is configured to control the host interface to control the transfer of the at least one packet based on the status data.

11. An operation method of a storage device, comprising:

receiving at least one packet including a TRIM command from a host device;

comparing a trim range of the TRIM command and a first trim range threshold value, the first trim range threshold value determined based on status data generated by monitoring the at least one packet;

determining, based on the comparison, that a trim path for processing the TRIM command is a single logical page number (LPN) path or a range LPN path; and processing the TRIM command based on the trim path.

12. The operation method of claim 11, wherein:

the storage device further includes a buffer memory configured to store a plurality of first data;

the determining the trim path includes selecting the range LPN path in response to the trim range being greater than the first trim range threshold value; and the processing the TRIM command includes detecting a plurality of second data corresponding to the TRIM command by entirely searching the plurality of first data, and processing the TRIM command by invalidating the plurality of second data.

13. The operation method of claim 12, wherein:

the determining the trim path includes selecting the single LPN path in response to the trim range being smaller than the first trim range threshold value; and the processing the TRIM command includes detecting the plurality of second data by individually searching each of the plurality of second data among the plurality of first data, and processing the TRIM command by invalidating the plurality of second data.

14. The operation method of claim 11, further comprising:

determining whether a performance indicator for the storage device is satisfied; and determining a second trim range threshold value based on the status data in response to the storage device not satisfying the performance indicator.

15. The operation method of claim 14, wherein the comparing includes comparing the second trim range threshold value and the trim range of the TRIM command.

16. A storage system, comprising:

a storage device configured to receive at least one packet and a first trim range threshold value, the at least one packet including a TRIM command from a host device, the storage device configured to generate status data by monitoring the at least one packet, determine that a trim path for processing the TRIM command is a single logical page number (LPN) path or a range LPN path by comparing the first trim range threshold value and a trim range of the TRIM command, and process the TRIM command based on the trim path; and the host device configured to receive the status data from the storage device and determine the first trim range threshold value based on the status data.

17. The storage system of claim 16, wherein:

the storage device further includes a buffer memory configured to store a plurality of first data; and the trim path includes the range LPN path configured to detect a plurality of second data corresponding to the TRIM command among the plurality of first data by entirely searching the plurality of first data, and the single LPN path configured to detect the plurality of second data by individually searching each of the plurality of second data among the plurality of first data.

18. The storage system of claim 17, wherein:

the storage device is configured to determine the single LPN path as the trim path in response to the trim range being greater than the first trim range threshold value; and the storage device is configured to determine the range LPN path as the trim path in response to the trim range being smaller than the first trim range threshold value.

19. The storage system of claim 16, wherein the storage device is configured to a determine whether a performance indicator for the storage device is satisfied, and in response to the performance indicator not being satisfied, transmit the status data to the host device.

20. The storage system of claim 19, wherein:

the host device is configured to determine a second trim range threshold value based on the status data, and the storage device is configured to receive the second trim range threshold value and determine the trim path for processing the TRIM command by comparing the second trim range threshold value and the trim range of the TRIM command.

* * * * *